Feb. 2, 1943. B. W. NORDLANDER 2,310,111
METHOD OF DETERMINING THE POROSITY OF MATERIALS
Filed Sept. 21, 1940
Fig. 3
KRAFT CONDENSER PAPER
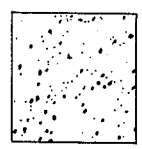
Fig. 4
TYPEWRITER PAPER
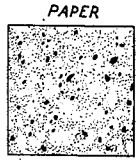
Fig. 5
PAD PAPER
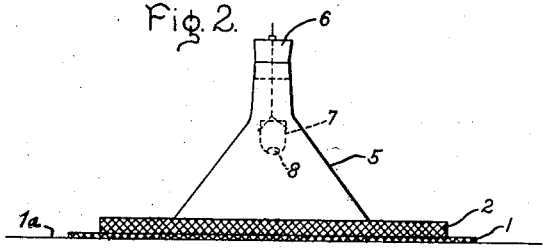
Inventor:
Birger W. Nordlander,
by Harry E. Dunham
His Attorney.

Patented Feb. 2, 1943

2,310,111

UNITED STATES PATENT OFFICE 2,310,111

METHOD OF DETERMINING THE POROSITY OF MATERIALS

Birger W. Nordlander, Schenectady, N. Y., assignor to General Electric Company, a corporation of New York Application September 21, 1940, Serial No. 357,828

4 Claims. (Cl. 73—51)

The present invention relates to means for determining the porosity of various materials. It is particularly concerned with the determination of the porosity of sheet materials, such as paper, fabric and the like, by means of the reaction of mercury vapor on a composition containing selenium and sulphur hereinafter referred to as selenium sulphide.

In order to control the quality of various materials, particularly sheet materials such as paper and the like, during the manufacture thereof, it is often desirable to gain more specific knowledge concerning the porosity thereof. This is important, for example, in the manufacture of condenser paper, particularly with regard to the effect of the porosity of any given paper on the properties and performance of electrical condensers containing the same.

Although the description of my invention is concerned primarily with its application to paper, it is to be understood that it may be used in estimating or recording the porosity of other materials such as fabrics, films obtained from various natural and synthetic products, metal foils, ceramics, etc., whether such materials are in the process of being manufactured or in the form of shaped or completely fabricated articles.

The effect of mercury vapor on selenium sulphide is known. For example, in my United States Patent 1,711,742 there is set forth a method of employing active selenium sulphide for measuring the amount of mercury vapor in air or other gases. Briefly, this method consists in directing a stream of the gas, for instance, air, to be tested at a predetermined velocity and temperature against a paper carrying a yellow film of finely divided selenium sulphide. In accordance with the patented method the concentration of mercury vapor in the air may be accurately determined by comparing the degree of blackening of the selenium sulphide produced in a given time of exposure at a given temperature with a calibrated chart.

I have found that when a paper, or similar base, coated with selenium sulphide, which will henceforth be referred to as the positive or printing paper, is covered with a material which is porous and is thereafter exposed to mercury vapor, the printing paper does not become uniformly blackened, as is the case when mercury vapor is allowed to act directly upon it, but instead becomes speckled, mottled or non-uniformly darkened in a manner closely associated with the porosity of the material. Upon sufficient length of exposure to mercury vapor there may appear on the yellow printing paper certain black spots or areas corresponding to the points where the pores emerge on the side of the superimposed material in contact with the printing paper. In the case of a dense, sized paper, there will be no black spots formed on the printing paper even after prolonged exposure, indicating that such material is free from directly connecting pores. The prints obtained from certain other types of paper, such as the so-called "kraft" condenser paper, exhibit a certain number of minute black spots or specks of varying size which may be counted and expressed as a number per given area. Certain grades of cardboard will produce characteristic configurations corresponding to the structural arrangement of the fibers constituting the side of the board in contact with the printing paper. Again a paper of very soft, loose structure, such as ordinary filter paper, will give a print which consists of an infinite number of small spots merging into each other, probably best described as a non-uniform darkening of the sensitized film. Thus the design produced on the printing paper gives a graphic record of the porosity or pore pattern of the material.

Means for carrying out my invention will be understood more clearly from a reference to the accompanying drawing in which Figs. 1 and 2 show two simple arrangements for determining the porosity of sheet materials in accordance with my invention and Figs. 3, 4, and 5 show the results obtained from tests on certain well known types of paper.

With reference to Fig. 1, a sheet of paper or the like 1 sensitized with a layer or coating of selenium sulphide 1a is covered with the sheet material 2 to be tested and a heavy copper bar 3, smoothly finished and amalgamated on one side, is placed directly on top of the test sample with the amalgamated side 4 facing, and in contact with, the upper surface of the test piece. If desired, a heavy weight (not shown) may be placed on top of the copper bar to press the test piece 2 firmly against the sensitized film 1. With this arrangement the amalgamated surface of the copper bar acts as a source of mercury vapor, which vapor penetrates the pores of the interposed test sample to contact the selenium sulphide sensitized paper. The reaction of this vapor on the sensitizer produces the characteristic designs or patterns referred to above.

Although this method is preferred on account of its simplicity and the fact that it gives excellent results in testing very thin test papers, an inverted funnel 5 (Fig. 2) with its stem closed by a cork 6 from which is suspended an open container 7 containing a globule of mercury 8 may be substituted for the copper bar, particularly when the test sample is a thick or heavy paper such as cardboard or the like. With this type of equipment sufficient mercury vapor is present inside the inverted beaker or funnel to give a good print in a few hours time at room temperature.

Care must be taken in all cases that the test sample firmly and intimately contacts the surface of the selenium sulphide paper as otherwise mercury vapor issuing from the pores of the test sample may diffuse out between the test sample and the paper and form broad smudges corresponding to any loose contact areas rather than clearly defined spots corresponding to the individual pores.

The optimum time of exposure at any given temperature will depend on the porosity of the material being tested. With highly porous material, an exposure of only a few minutes duration may be sufficient whereas with relatively non-porous materials an exposure of several hours, or even overnight, may be desirable. If desired, a print indicating the porosity of any given sheet material may be obtained in a much shorter time by methods similar to that set forth and described in my above mentioned patent; that is, by blowing air or other suitable gas carrying mercury vapor against the test sample interposed between the source of mercury vapor and the printing paper and in intimate contact with the selenium sulphide coated surface.

With any of the above methods, the number of spots per given area on the selenium sulphide paper, or the depth of color thereof in the case of extremely porous papers, such as filter paper, obtained on exposure may be used as a measurement of the porosity of the test sample. With extremely porous papers a comparison of the porosity of different samples may be obtained by holding the time of exposure and the temperature constant in testing the samples and noting the depth of color, i. e. the change in color, of the prints so obtained; the more porous the material, the deeper the color of the print.

In the case of a material having a limited number of holes, i. e. one producing a print in which each of the individual pore openings show up as distinct spots or specks on the print, the size of these spots may be taken to indicate the relative size of the pore openings. On limited time of exposure a certain number or readily discernible spots appear. Increasing length of exposure brings out additional spots of smaller size while at the same time those first appearing will have become somewhat larger. This growth of the original spots is probably due to the fact that the mercury vapor continually and progressively reacts with the selenium sulphide in the immediate neighborhood of the pore openings. By prolonged exposure, it is possible to detect and count even the very minute pores present in the test piece.

The time required for any given test may be considerably shortened by holding the temperature somewhat above room temperature, for example, in the neighborhood of 60° to 70° C. However, the temperature should not be raised above that at which the selenium sulphide tends to become reddish indicating a chemical or physical change in the material itself.

In Figs. 3, 4 and 5 of the drawing are shown examples of prints obtained from samples of certain well known papers at room temperature by means of the equipment shown in Fig. 1.

The print of "Kraft condenser paper," (Fig. 3) showing about 200 holes or pores per square inch in the paper, was obtained by an exposure of 40 hours. This is a thin paper which is comparatively non-porous considering its thickness.

The second print labeled "Typewriter paper" (Fig. 4) was obtained by a 16 hour exposure using a 100 per cent rag paper whereas the third print labeled "Pad paper" (Fig. 5) is that of ordinary highly porous yellow paper ordinarily sold in tablet form. The print was obtained by an exposure of only 16 minutes.

The prints obtained in accordance with my process may be preserved for future reference either by storing them in a mercury-free atmosphere or by coating the prints with some material impervious to mercury vapor, such as a lacquer or the like. This is important for purposes of control whenever it is necessary to check and record the porosity of certain grades of paper from time to time.

What I claim as new and desire to secure by Letters Patent of the United States is:

1. The method of graphically recording the porosity of sheet material which comprises bringing one side of said sheet material into intimate contact with a film containing a composition of selenium and sulphur capable of being darkened by mercury and exposing the other side of said sheet material to a source of mercury vapor to obtain on the film an image conforming to the relative size and distribution of the pores in the sheet material.

2. The method of determining the porosity of fibrous sheet material which comprises bringing one side of said material into intimate contact with a sensitized film comprising selenium sulphide capable of being darkened by mercury and exposing the other side of said material to mercury vapor to obtain on the film an image corresponding to the pore pattern of said material.

3. In the method of graphically recording the pore pattern of a porous sheet material, the steps which comprise bringing one side of said sheet material into intimate contact with a film of selenium sulphide capable of being darkened by mercury, and exposing the other side of said sheet material to a source of mercury vapor at a temperature of about 60 to 70° C. to obtain a non-uniform darkening of the selenium sulphide film corresponding to the porous nature of said sheet material.

4. The method of producing a record of the porosity of paper which comprises bringing one side of said paper into intimate contact with a film of selenium sulphide capable of being darkened by mercury vapor and exposing the other side of said paper to a source of mercury vapor.

BIRGER W. NORDLANDER.